United States Patent
Mayer et al.

(10) Patent No.: US 6,681,476 B2
(45) Date of Patent: Jan. 27, 2004

(54) METHOD OF FORMING A STATOR CORE ASSEMBLY

(75) Inventors: Robert Russell Mayer, Schenectady, NY (US); Christian Lee Vandervort, Voorheesville, NY (US); Konrad Roman Weeber, Rexford, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/022,192

(22) Filed: Dec. 20, 2001

(65) Prior Publication Data

US 2002/0047462 A1 Apr. 25, 2002

Related U.S. Application Data

(62) Division of application No. 09/671,123, filed on Sep. 28, 2000, now Pat. No. 6,448,685.

(51) Int. Cl.[7] ............... H02K 15/00; H01R 43/06; H01F 7/06

(52) U.S. Cl. ............... 29/596; 29/598; 29/597; 29/609; 29/606; 310/42

(58) Field of Search ............... 29/596, 597, 598, 29/606, 609; 310/42, 218, 256

(56) References Cited

U.S. PATENT DOCUMENTS

| | | | | |
|---|---|---|---|---|
| 3,914,859 A | * | 10/1975 | Pierson | 29/596 |
| 5,570,503 A | * | 11/1996 | Stokes | 29/596 |
| 5,918,360 A | | 7/1999 | Forbes | |
| 6,278,217 B1 | * | 8/2001 | Kliman et al. | 310/254 |
| 6,304,018 B1 | * | 10/2001 | Ham et al. | 310/216 |

* cited by examiner

Primary Examiner—A. Dexter Tugbang
Assistant Examiner—Tim Phan
(74) Attorney, Agent, or Firm—Nixon & Vanderhye PC

(57) ABSTRACT

A stator core assembly is provided in which the winding is installed from the convex surface of an inner, strong tube, outwardly. The teeth or tooth structures that define the slots for the winding are secured to the strong tube and an outer core is secured to the outer ends of the teeth after the windings have been assembled.

9 Claims, 6 Drawing Sheets

US 6,681,476 B2

METHOD OF FORMING A STATOR CORE ASSEMBLY

CROSS REFERENCE TO RELATED DOCUMENT

This application is a division of application Ser. No. 09/671,123, filed Sep. 28, 2000 now U.S. Pat. No. 6,448,685 B1, the entire content of which is hereby incorporated by reference in this application.

BACKGROUND OF THE INVENTION

The present invention relates to electrical machines such as generators and, more particularly, to a stator assembly in which the windings are laid into stator slots defined about an inner core and thereafter an outer core is installed to complete the assembly.

In electrical machines, armature windings must be assembled parallel to the axis of the stator.

Conventional generator windings are composed of bars that are brazed at the end windings to create coils. These pre-formed bars are inserted through the bore of the stator and placed into rectangular slots in a core composed of laminations. As such, the conventional generator windings do not need significant machinery to install. If these windings are defined by cables, the cable must be formed into a straight section and end arms. This requires significant forces to be applied to shape the cable which will in general require a large mechanism, larger than could be conveniently passed through the bore of a conventional machine.

From about 1959 through 1965, GE Power Systems Lynn Works developed a cable wound generator. This generator used a winding approach where each phase belt of the winding was drawn through a core with discreet holes for the cable. This required all of the cable to be drawn through most of the core.

In 1999, ABB released their Powerformer, a high-voltage, cable wound generator that uses a similar approach to the Lynn system. The major differences include the fact that the core has a slot with a semi-circular indentations to hold the cables.

It would be desirable to reduce winding time by providing greater access to the machine during the winding application process. Even if the windings are defined by bars or full coils, it would be desirable to provide greater access to the teeth and, more particularly, the slots therebetween for assembly.

BRIEF SUMMARY OF THE INVENTION

The invention provides an inner core for electrical machines such as generators for installing windings from the convex surface of the inner core radially outwardly rather than inserting cables or bars through the bore of an assembled stator and placing them into rectangular slots in a core composed of laminations. More specifically, to provide more access to the machine during the assembly process and to minimize winding time, an inner core is provided for receiving teeth, each of which are defined by a plurality of laminations and about which the windings are respectively disposed. An outer core is applied to the assembly of the inner core and teeth with windings applied thereto to complete the stator assembly. Because the outer core is applied after winding has been completed, full access to the slots between the teeth and the windings disposed therewithin is provided during the assembly process.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
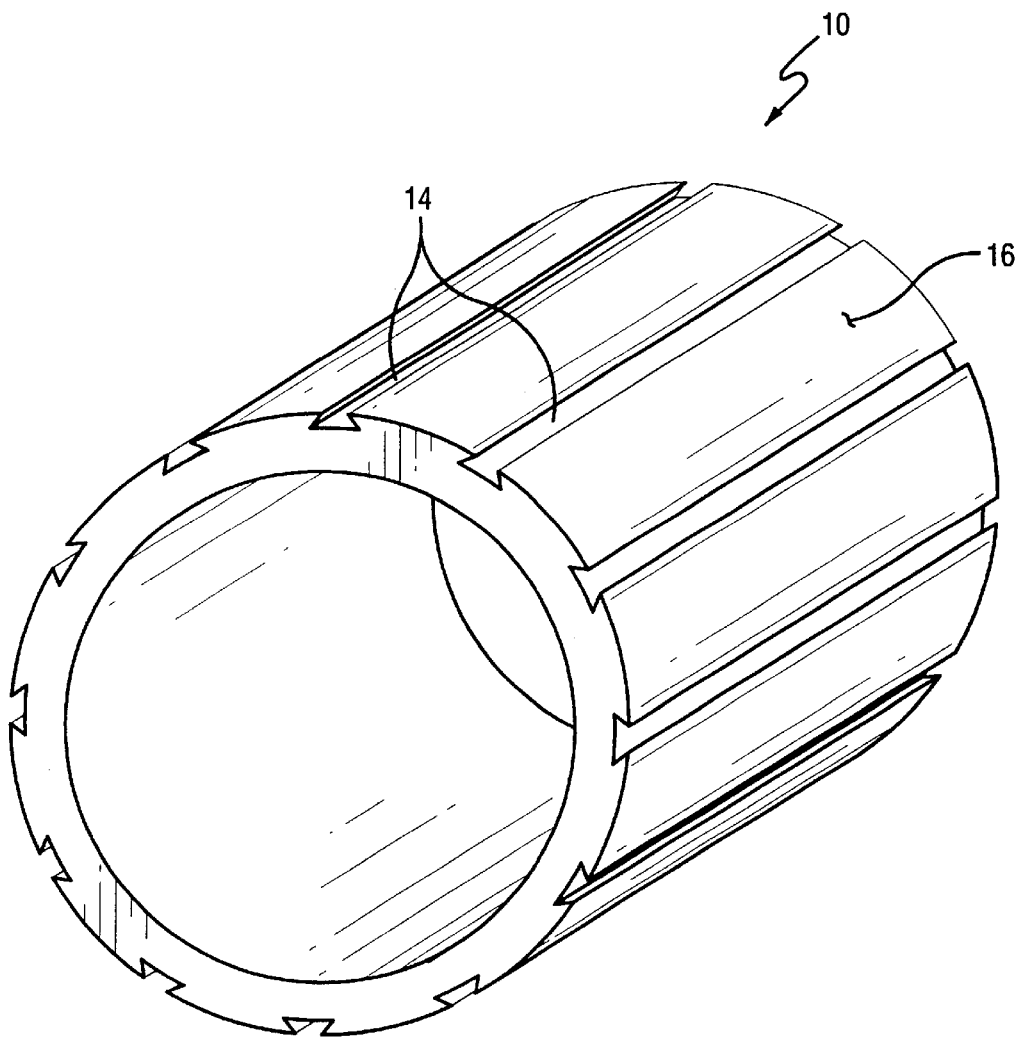
FIG. 1 is a schematic perspective view of an inner core/strong tube provided according to an exemplary embodiment of the invention.

The stator assembly of the invention is composed of an inner core defining a strong tube 10 to which prestacked teeth 12 are applied. An exemplary strong tube 10 is schematically illustrated in FIG. 1. The strong tube is formed from a non-conductive and non-magnetic material such as fiberglass or other composite material. A plurality of prestacked teeth 12 are to be secured to the strong tube as described in greater detail below. To that end, a plurality of first connector structures 14 are defined generally axially along the strong tube on the outer peripheral surface 16 thereof. In the illustrated embodiment, the first connector structures are dovetail slots 14 that are machined into the strong tube outer peripheral surface 16 along the length thereof. For purposes of illustration, twelve dovetail slots 14 are illustrated as machined into the strong tube 10 of FIG. 1. The number of dovetails machined into the strong tube depends upon the number of teeth or tooth structures 12 the strong tube is adapted to receive. In general, the teeth are applied in multiples of six and in a typical application, 36 to 72 teeth/slots are provided in the final assembly. Thus, the illustrated strong tube having only twelve slots is for illustrative purposes only and it is to be understood that in most applications several times the number of illustrated first connector structures, such as dovetail slots, will be provided for accommodating the teeth of the assembly being produced.

As will be apparent, the strong tube provides, by virtue of its structure and composition, mechanical support during assembly and increases the overall stiffness of the entire winding and core structure. The strong tube may have ventilation holes drilled through it radially or axial cooling ducts. In the alternative, the strong tube may be provided as a solid, imperforate piece so as to facilitate the definition of separate cooling circuits for the stator and rotor.

Figure 2:
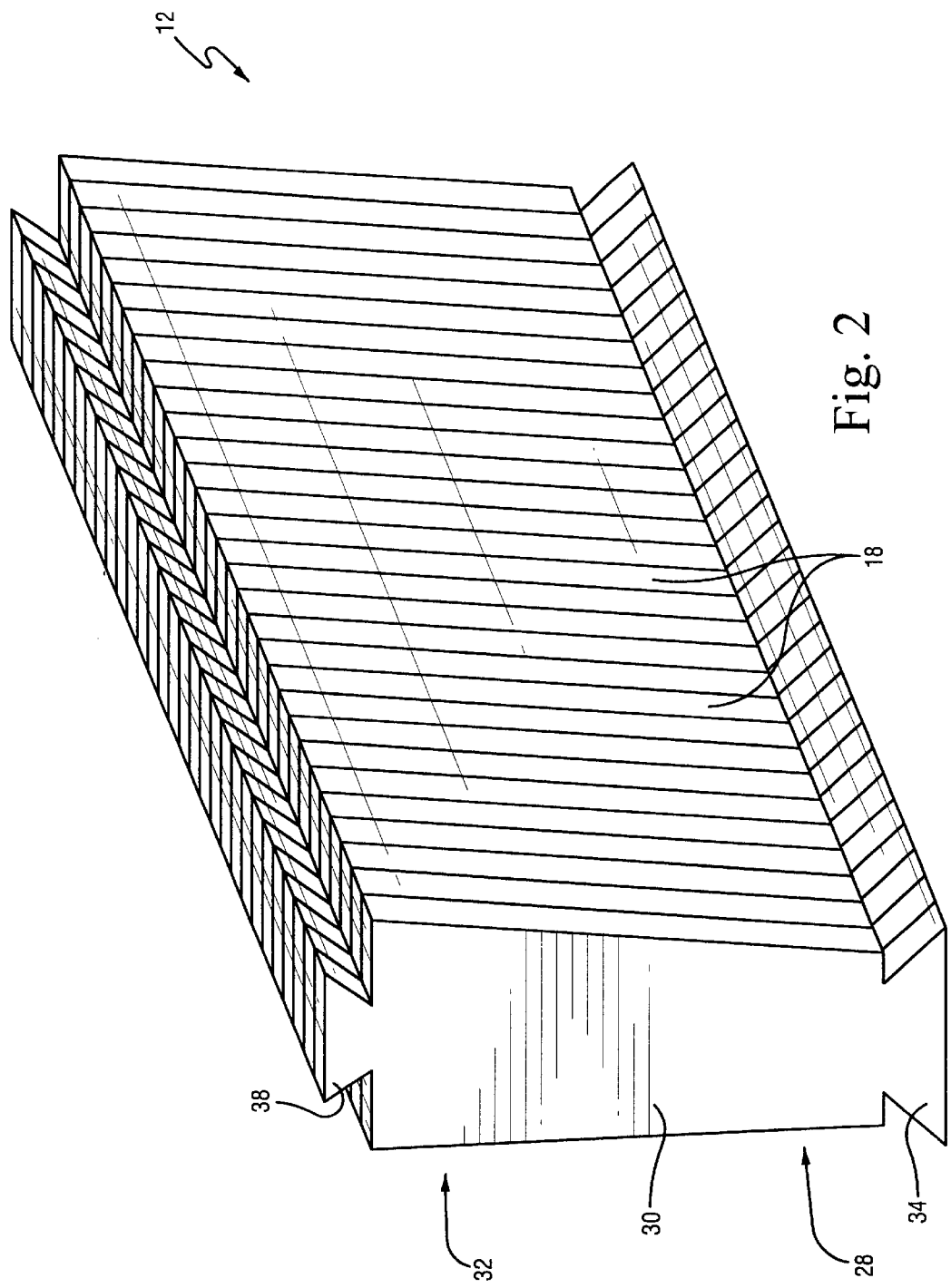
FIG. 2 is a schematic perspective view of a tooth assembly for being secured to the inner core/strong tube.
Figure 3:
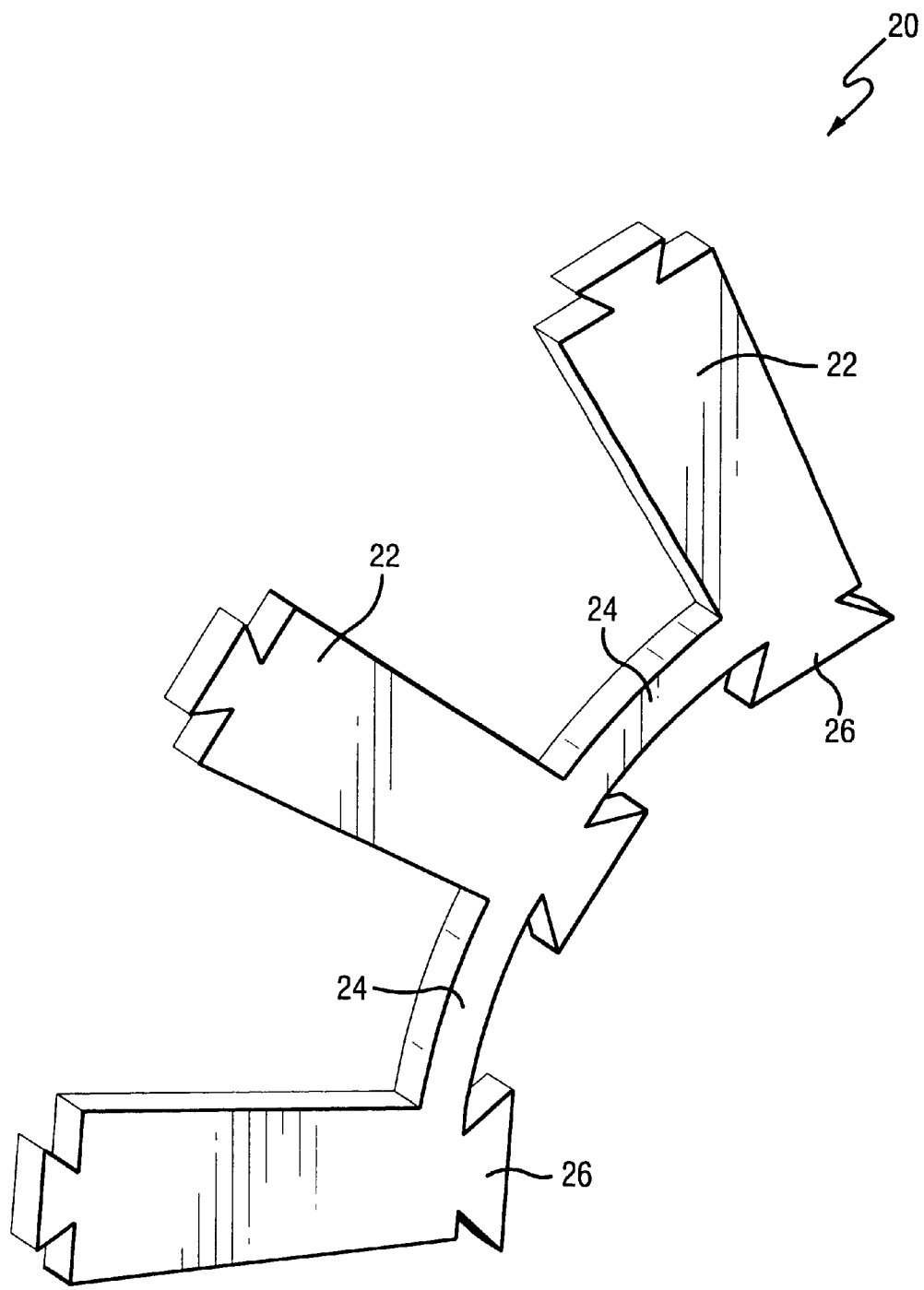
FIG. 3 is a schematic perspective view of a stiffener insert for being disposed axially between teeth in the assembled stator core of the invention.

As noted above, prestacked teeth 12 are secured to the outer peripheral surface 16 of the strong tube 10. An exemplary prestacked tooth structure 12 is illustrated in FIG. 2. These teeth are similar to existing core lamination materials and are pre-assembled, separately from the strong tube, as a stack of laminations 18. This assembly may either be by resin-impregnation, by a pair of axial non-magnetic dowels or other fasteners (not shown), or a combination of these assembly processes. The tooth structure 12 may extend the entire length of the machine or may be a fraction of that length. Where the tooth structure is a fraction of the total length of the machine, stiffeners are desirably added axially between the teeth 12. An exemplary stiffener 20 is schematically illustrated in FIG. 3. In the illustrated embodiment, the stiffener includes tooth portions 22 for being axially aligned with the prestacked teeth 12, circumferential connecting portions 24 for extending circumferentially between the teeth portions 22, and radial connector portions 26 for being received in the dovetail slots 14 or otherwise engaged with the strong tube outer peripheral surface 16. These stiffeners 20 help to connect the teeth 12 and prevent motion between the teeth. In an exemplary embodiment, the stiffeners are made of a non-magnetic material so as to avoid a short from tooth to tooth. If, however, the connecting portions 24 are sufficiently small, the stiffener may be made of a magnetic material.

As noted above, the prestacked teeth 12 are preassembled separately from the strong tube 10. An advantage of separately forming the teeth is that the shape of the teeth can be determined generally as desired for the assembly. Thus, in the illustrated embodiment, the teeth have a generally flared shape with a smallest circumferential dimension at the radially inner end 28 of the tooth main body 30 and a greatest circumferential dimension at the radially outer end 32 of the tooth main body 30. As such, the teeth may define a generally rectangular slot therebetween. In the alternative, although not illustrated, the teeth can be generally rectangular in shape, can taper in the opposite direction from that shown in FIG. 2 and/or can include a section or sections that wrap around individual windings. The laminations 18 from which the teeth 12 are formed are advantageously stamped from a suitable punching material so as to make any of a variety of such shapes feasible. Also, a variety of complementary first and second connector structures 14, 34 can be respectively defined on the strong tube and at the radially inner end 28 of each tooth. In the illustrated embodiment, a dovetail projection 34 is defined at the radially inner end 28 of the tooth for being received in a corresponding dovetail slot 14 of the strong tube 10. It is to be understood that while a dovetail structure is currently preferred, as illustrated, the parts having the dovetail projection and groove could be reversed, dovetail slots and projections could be provided alternately about the circumference, and/or another complementary geometric projection and groove could be provided. A third connector structure 38 is also preferably provided for engaging an outer core component 42 at the radially outer end 32 of the tooth 12. In the illustrated embodiment, dovetail slots 36 may be defined in the outer core. Accordingly, the connector structure at the radially outer end 32 of each tooth is preferably a corresponding dovetail projection 38.

Figure 4:
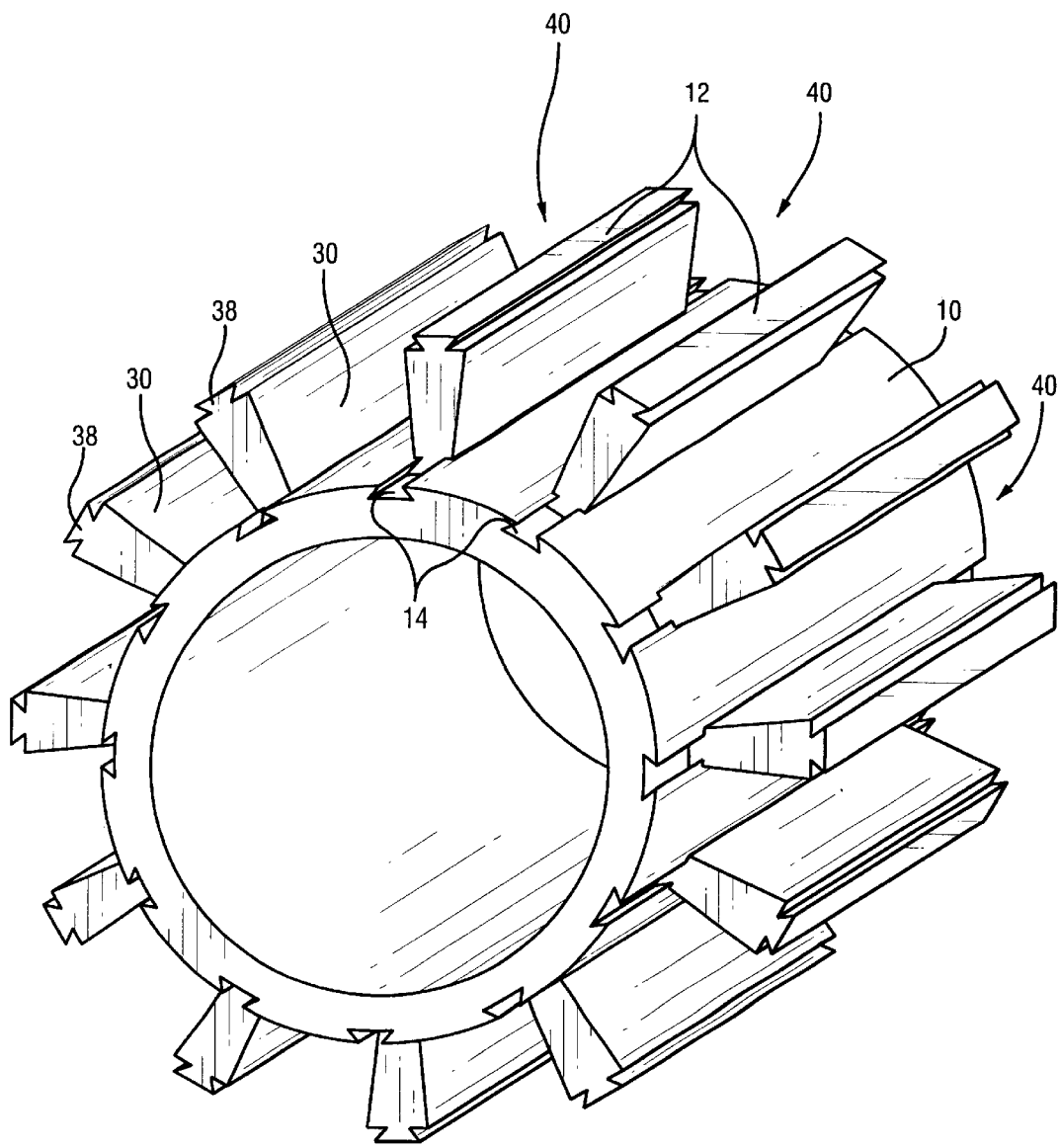
FIG. 4 is a perspective view showing a plurality of teeth engaged with an outer periphery of the inner core/strong tube.
Figure 5:
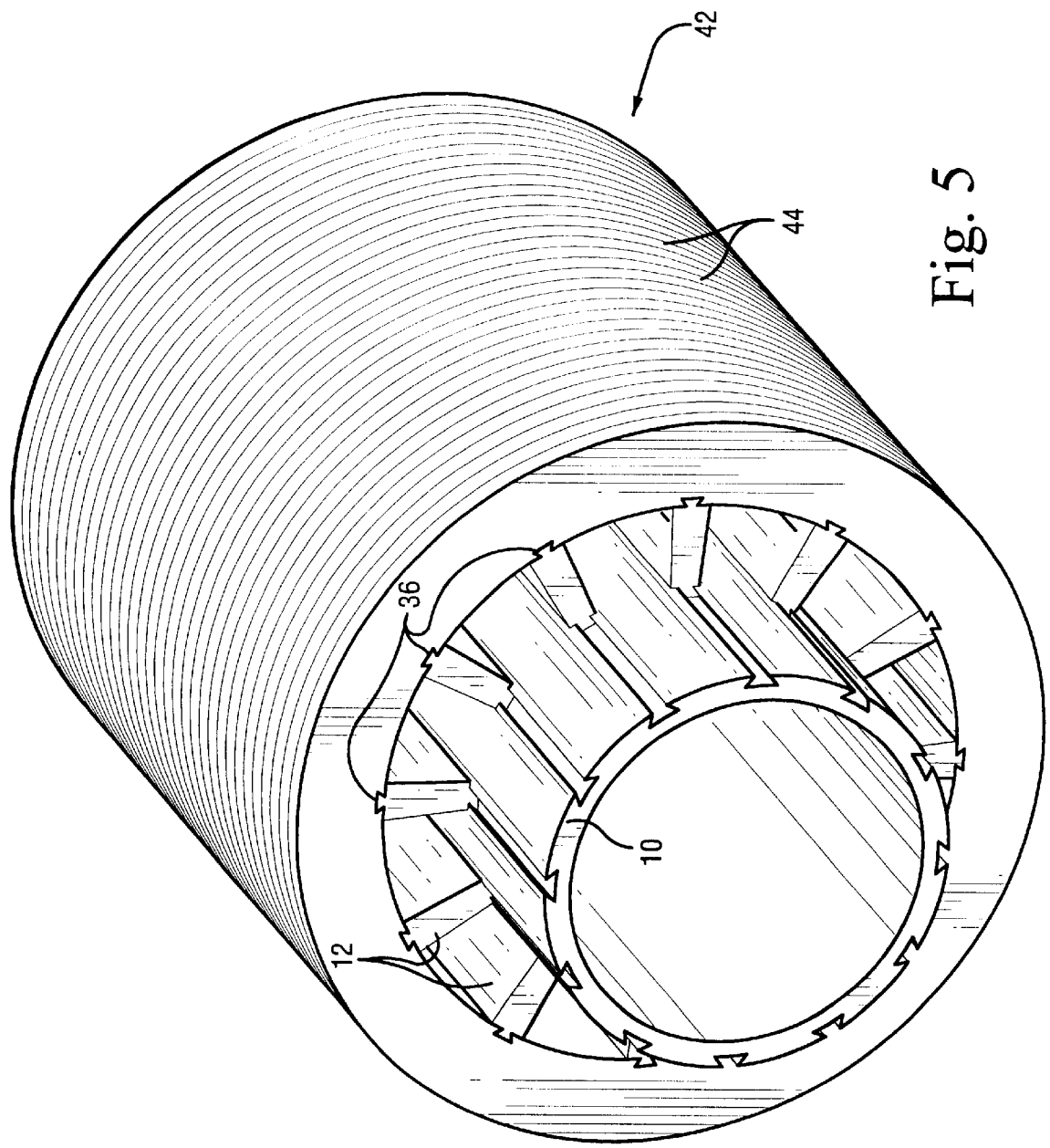
FIG. 5 is a schematic perspective view of the assembled stator core including an outer core secured to the outer periphery of the teeth, with windings omitted for clarity.
Figure 6:
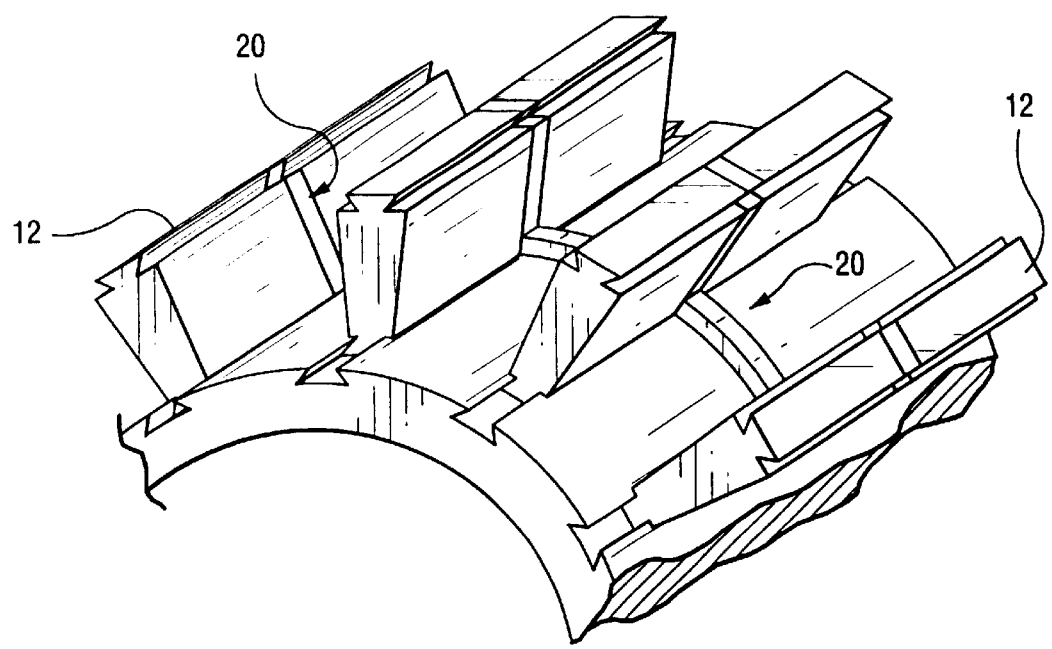
FIG. 6 is a perspective view showing a plurality of axially adjacent teeth engaged with an outer periphery of the inner core/strong tube and having a stiffener insert disposed therebetween.

With reference to FIG. 4, wherein the laminations that define the teeth 12 are omitted for clarity, during winding, the windings (also omitted for clarity) whether they be cables, bars or complete coils, are laid into the slots for windings 40 defined between the teeth 12, along with any slot supports deemed necessary or desirable. Also, structure defining cooling channels, instrumentation, and the like can be disposed in the slots as appropriate. Once the winding process is completed, the outer core 42 is installed to complete the assembly. The outer core 42, like teeth 12, is formed from conductive laminations 44 that are stacked to define the outer core structure. The outer core 42 may be installed around the outer diameter of the teeth either with dovetails 36, 38 as illustrated in FIG. 5 or with a shrink fit. As a further alternative, the wound inner core may be placed in a prestacked outer core and frame assembly.

A significant advantage of the above-described inner core assembly is the ability to assemble a winding within a tapered slot with larger windings at the outer diameter. Conventional configurations allow only a drawing of windings parallel to the axis of the machine, which is a longer process if larger windings are on the outer diameter. Because the teeth 12 and outer core 42 (yoke) are separate components, it is further possible with the disclosed invention to provide different grain alignments in these components thereby reducing losses over conventional punchings that have teeth and yoke with the same grain alignment.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of forming a stator core assembly comprising:
   providing an inner core having a bore defined therethrough and a plurality of first connector structures defined generally axially thereof on an outer peripheral surface thereof;
   providing a plurality of tooth structures, each said tooth structure being formed from pre-stacked laminations;
   securing at least one tooth structure to each said first connector structure whereby each said tooth structure is secured to said inner core and projects radially outwardly therefrom, thereby defining radial and axial slots therebetween for receiving generator winding structures;
   disposing at least one winding structure in each said slot;
   fixedly securing an outer core to radially outer ends of said tooth structures, wherein the outer core is formed from pre-stacked laminations, said securing comprising mounting at least two tooth structures axially adjacent one another on the outer surface of the inner core along each said first connector structure; and disposing a stiffener between each said axially adjacent tooth structures, wherein said stiffener comprises a plurality of circumferentially spaced tooth portions, said tooth portions being interconnected with connecting portions.

2. A method as in claim 1, wherein said inner core with tooth structures secured thereto is inserted into the pre-assembled outer core.

3. A method as in claim 1, wherein the stiffener is made of a non-magnetic material.

4. A method as in claim 1, wherein the laminations defining the teeth and the laminations defining the outer core have different grain alignments, respectively.

5. A method as in claim 1, wherein the inner core is made from a non-magnetic composite material.

6. A method as in claim 1, wherein each tooth portion defines a connector portion at a radially inner end thereof that is complimentary to said first connector structures and wherein said securing comprises engaging said complimentary connector portion to said first connector structure.

7. A method as in claim 6, wherein said connector portion comprises a dovetail and wherein said first connector structure comprises a dovetail groove and wherein said securing comprises axially sliding said connector portion of each said tooth portion into said first connector structure.

8. A method as in claim 1, wherein each said tooth portion has a second connector portion at a radially outer end thereof complimentary to second connector structures defined generally axially of and on an inner peripheral surface of said outer core.

9. A method as in claim 8, wherein said second connector portion comprises a dovetail and said second connector structures comprise dovetail grooves for axially slidably receiving said second connector portions.

* * * * *